Dec. 2, 1924.
P. S. BAUER
MOTOR DRIVEN VEHICLE
Filed Sept. 1, 1923
1,518,045
3 Sheets-Sheet 1
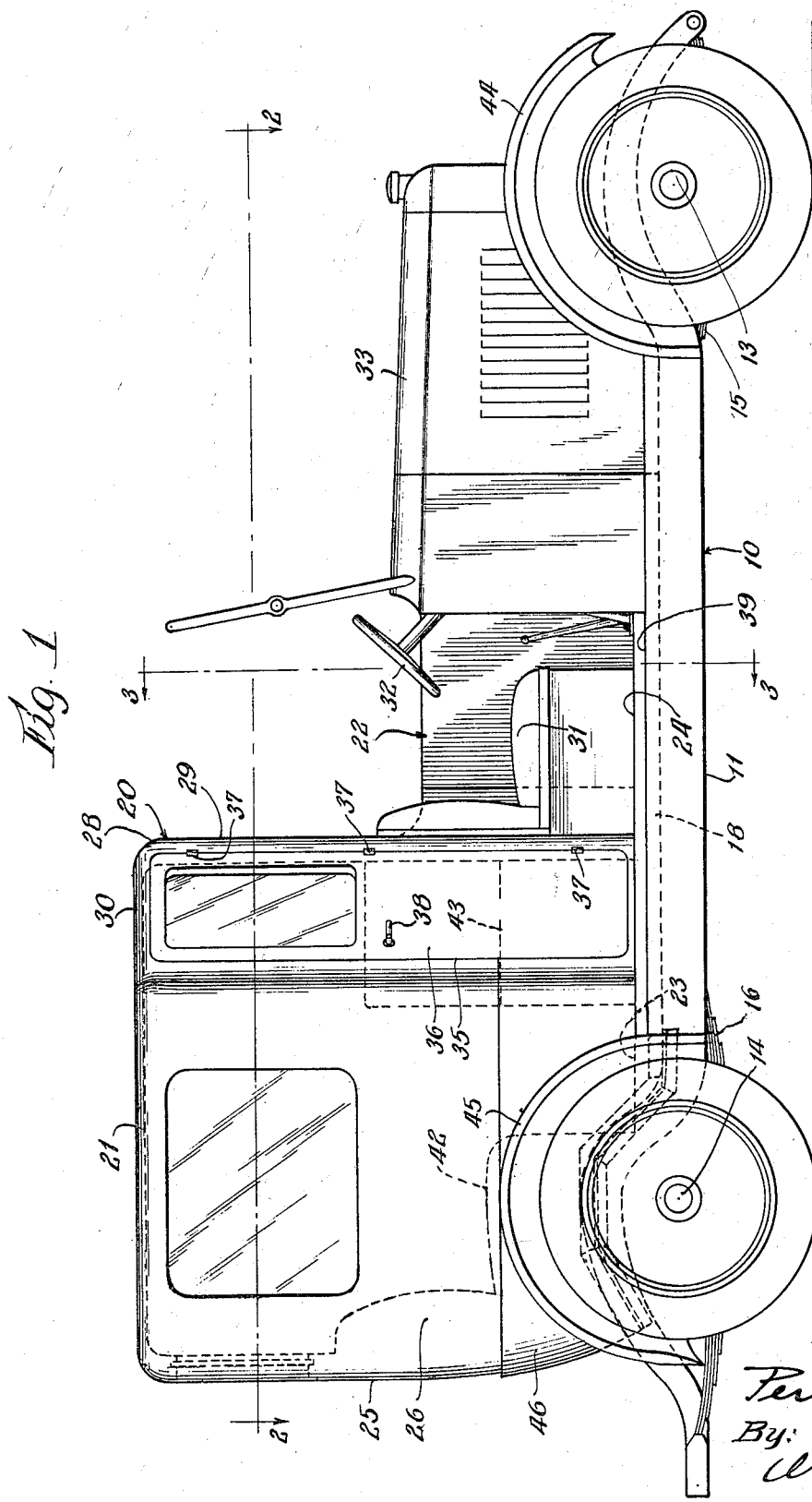

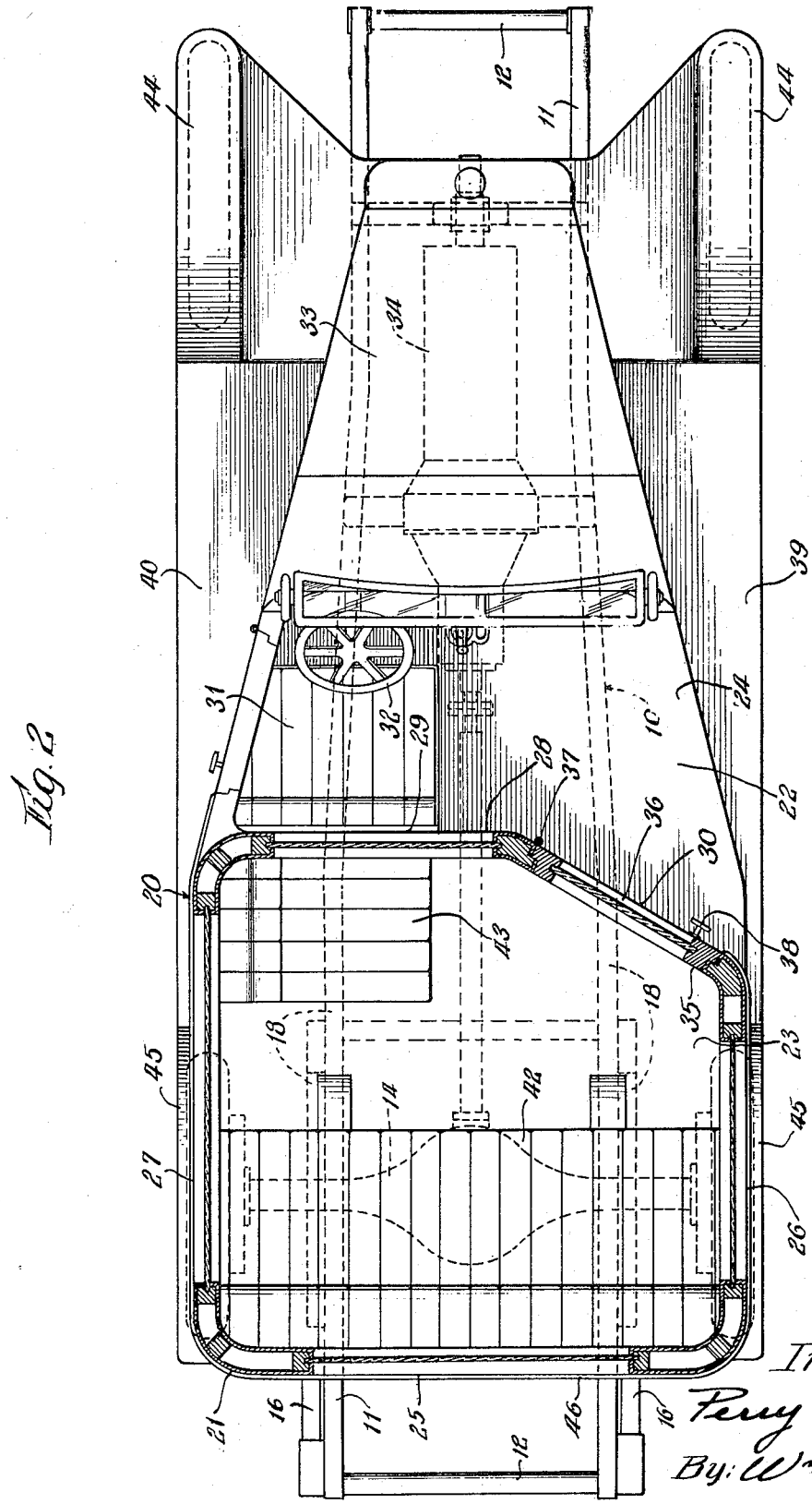

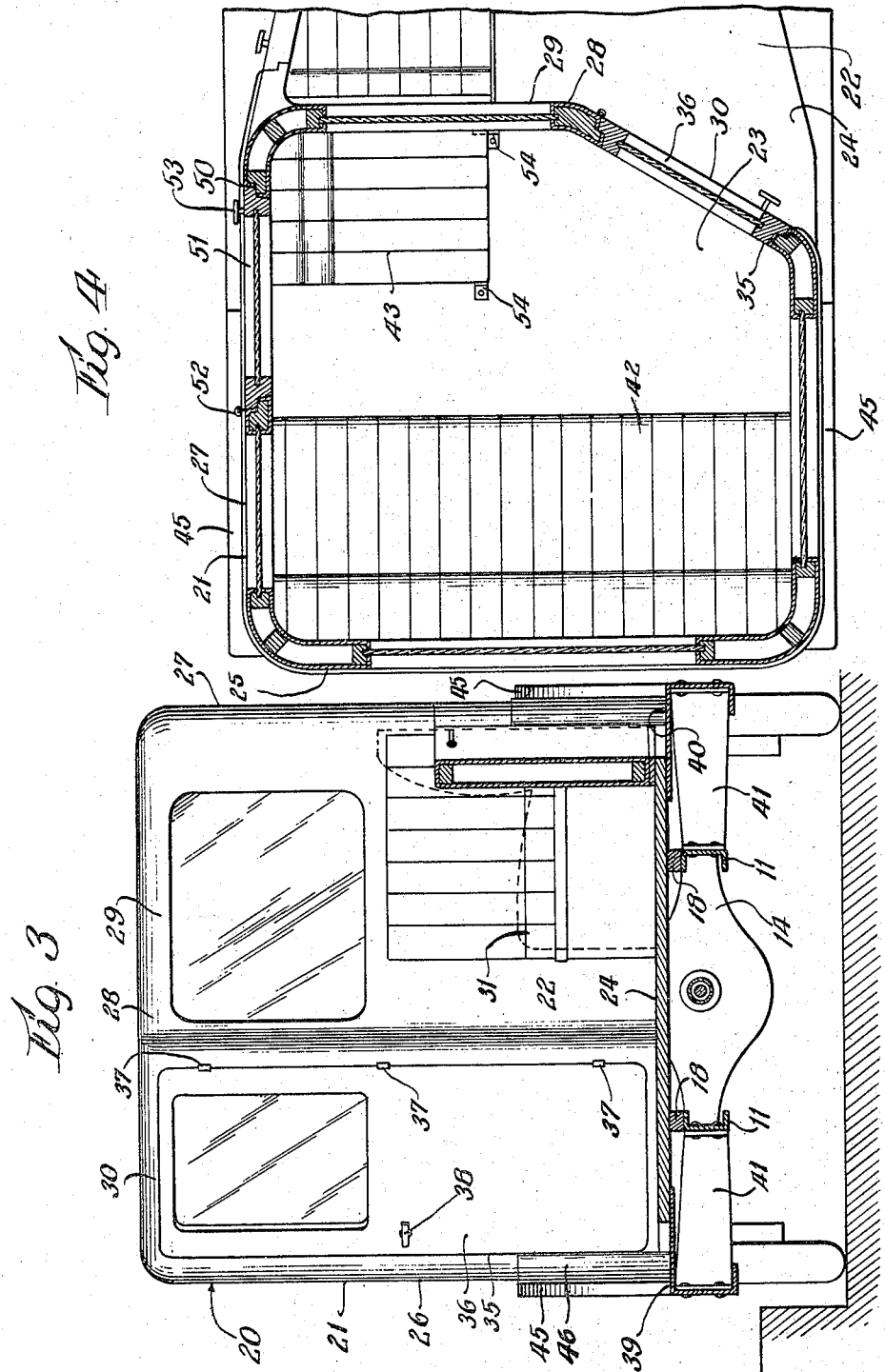

Patented Dec. 2, 1924.

1,518,045

UNITED STATES PATENT OFFICE.

PERRY S. BAUER, OF CHICAGO, ILLINOIS.

MOTOR-DRIVEN VEHICLE.

Application filed September 1, 1923. Serial No. 660,481.

*To all whom it may concern:*

Be it known that I, PERRY S. BAUER, a citizen of the United States, residing at Chicago, in the county of Cook and State of Illinois, have invented certain new and useful Improvements in Motor-Driven Vehicles, of which the following is a specification.

This invention relates to motor driven vehicles and has for its objects to provide for lowering the center of gravity of the vehicle, to provide for increasing the seating capacity of the vehicle, to provide for eliminating the usual steps and at the same time to provide for entering and leaving the vehicle by a single step as distinguished from present practice which requires one to make at least two steps on entering or leaving a vehicle due to the presence of the running boards below the floor level of the vehicle.

These and other objects of my invention will be more fully set forth as the detailed description progresses, reference being had to the accompanying drawings, wherein.

Fig. 1 is a side elevation of an automobile having a body embodying the novel features of my invention.

Fig. 2 is a horizontal section taken on line 2—2 of Fig. 1.

Fig. 3 is a transverse section taken on line 3—3 of Fig. 1, and

Fig. 4 is a horizontal section taken through the cab of an automobile body and it illustrates another form which my invention may take.

Referring for the present to Figs. 1, 2 and 3 of the drawings, the reference character 10 designates in its entirety a chassis of an automobile having a body which embodies the novel features of my invention. While the construction of the chassis forms, by itself, the subject matter of a copending application, it will be noted, as this description progresses, that the chassis is particularly adapted to receive a body embodying the novel features of my invention. As shown, the chassis preferably comprises a pair of longitudinally disposed side members 11 and a pair of end members 12. Each of the side members 11 preferably terminates in upwardly extending arcuate portions adapted to accommodate the front and rear axles of the vehicle, the front axle being indicated at 13 and the rear axle being indicated at 14. The frame which comprises the side members 11 and end members 12 is supported upon the axles 13 and 14 by springs 15 and 16 secured to the frame and to the axles by any suitable means and in any suitable manner.

The chassis is provided with a plurality of sills 18 resting upon the side members 11 of the chassis (Fig. 3). The sills are in turn adapted to receive and support an automobile body 20 which forms the subject matter of this application. The automobile body 20 comprises a cab 21 and a driver's compartment 22, the driver's compartment being disposed directly in front of the cab 21. It will be noted that the floor 23 of the cab 21 and the floor 24 of the driver's compartment 22 are substantially flush and that these floors rest upon the aforementioned sills 18. It will also be noted that the side members 11 of the chassis 10 are designed so as to permit the floors of the cab and the driver's compartment to lie but a short distance above the axes of the wheels of the vehicle as compared with the construction usually employed in automobiles of this type. As shown, the horizontal intermediate portion of each of the side members 11 is depressed between the front and rear axles 13 and 14 into substantially the horizontal plane thereof. The advantage of this construction is that the center of gravity of the automobile is lowered and the possibilities of overturning of the vehicle, are lessened. By bringing the level of the floor down to substantially the horizontal plane of the front and rear axles, the floor is substantially at the level of the usual running boards, which arrangement obviates the necessity of climbing into the vehicle and the driver or the passengers of the vehicle may leave or enter the vehicle in a single step.

In the preferred form of my invention, the cab 21 comprises a rear wall 25, side walls 26 and 27, and a front wall 28. The front wall 28 comprises a plurality of panels 29 and 30, the panel 29 being disposed transversely of the vehicle and the panel 30 being disposed diagonally of the vehicle. It will be readily understood that the front wall 28 may be defined as a bent wall having a portion thereof inclined rearwardly to meet a side wall of the cab.

Disposed in the driver's compartment 22 and built directly against the panel 29 is a driver's seat 31 which is conveniently disposed with respect to the usual steering wheel 32 and the usual levers for controlling the gear shift, the clutch and the brakes of the vehicle. It will be noted that the automobile is of the usual left hand drive construction and that it is provided with the usual hood 33 for enclosing a power unit 34. This disposition of the driver's seat 31 permits a door opening to be built in the front wall of the cab. In the embodiment of my invention which is illustrated in the drawings, the door opening is formed in the diagonally arranged panel 30 and is designated by the reference character 35. A door 36 for the door opening 35 is carried by hinges 37, the hinges 37 being associated with that side edge of the door which is nearest the drivers seat. A door knob or handle 38 for actuating suitable latch mechanism (not shown) affords means for opening and closing the door. This arrangement of the door opening in the front wall 28 of the cab permits the driver to open and close the door without leaving his seat and without the aid of intervening door-opening devices. A further advantage of this arrangement is that the passenger, when entering the cab, steps through the driver's compartment and may readily direct the driver as to the destination or the route to be followed, for which purpose the side of the driver's compartment adjacent the door in the rearwardly extending panel 30 is left open. A still further advantage is that the swinging movement of the door is confined substantially within the limits of the vehicle, this result being obtained by hinging the door as described above on the side of the panel 30 next to the driver's seat and by leaving the driver's compartment open on this side of the cab.

As best shown in Fig. 3, I prefer to provide the vehicle with running boards 39 and 40 which are carried by the chassis by means of suitable brackets 41 rigidly secured to the side members 11 of the chassis. For all practical purposes, the running boards 39 and 40 may be considered as being disposed in the same plane as the floors of the cab 21 and the driver's compartment 22. The running boards extend beyond the outer sides of the wheels of the vehicle so that when the vehicle is brought to a stop close by a curbing or sidewalk, comparatively little space need be left between the curbing or sidewalk and the running board. This is advantageous, for as shown in Fig. 3, the running board 39 and the floors of the cab and the driver's compartment will be disposed substantially flush with the upper surface of the sidewalk or curbing and a passenger or the driver need not climb into or out of the vehicle.

The side walls 26 and 27 of the cab 20 are preferably disposed in the planes of the rear wheels of the vehicle. As shown in Figs. 2 and 3, the outer surfaces of the side walls are disposed substantially flush with the outer surfaces of the rear wheels. This construction is a departure from the construction heretofore employed in automobile bodies of the class described and is advantageous in that it affords increased width of cab and consequently increased seating capacity for a given wheel base. Referring to Figure 2 of the drawings, it will be seen that the running boards 39 and 40 constitute continuations of the floor of the vehicle at substantially the level thereof and extend outwardly beyond the wheels, and therefore I am able to extend the body 20 in its full width a considerable distance in front of the rear wheels, as distinguished from standard or usual automobile practice, where the floor is considerably higher than the running boards or steps resulting in a floor much narrower than the floor of the present invention and therefore necessitating a body of considerably less width than I am able to obtain by my present invention. I prefer to make use of the increased width of the cab by providing a rear seat 42 in the cab, the seat 42 extending the entire width of the cab. I also prefer to provide an additional seat 43 disposed in that corner of the cab which is formed by the side wall 27 and the front wall 28. I find that this is an economical arrangement of the space within the cab and that with this arrangement the use of a door in the front wall of the cab does not subtract from the seating capacity of the cab.

The vehicle is preferably provided with the usual fenders 44 for the front wheels thereof and the usual fenders 45 for the rear wheels thereof. The fenders 44 and 45, together with the running boards 39 and 40, serve to protect the walls of the cab from injury, but as the walls of the cab are preferably constructed of comparatively thin sheet metal in accordance with the usual practice, I have provided a bent plate 46 secured to the rear wall 25 and the side walls 26 and 27. The bent plate 46 is adapted to reinforce and protect the lower portions of these walls as the lower portions of the walls are most likely to be injured when the vehicle accidentally collides with another vehicle.

While in the preferred form of my construction I provide but a single door for the cab, it will be necessary in some instances to provide a door through which passengers may enter the cab from the left hand side of the vehicle. In Fig. 4 I have shown a cab which is of the identical construction of the cab shown in Figs. 1, 2 and 3 of the drawings, with the exception that the side wall 27 is provided with a door opening 50. A door 51 for the door opening 50 is suitably secured in the opening by means of hinges 52, the door being provided with a handle 53 operating suitable latch mechanism (not shown). When the cab 21 is provided with a door 51 the corner seat 43 is hinged as indicated at 54 to permit the seat to be raised into an upright position. With the seat in its upright position the passengers may leave and enter the cab through the door opening 50.

I am aware that changes in the form, construction and arrangement of parts may be made without departing from the spirit and without sacrificing the advantages of the invention and I reserve the right to make all such changes as fairly fall within the scope of the following claims:

I claim:

1. A vehicle body comprising a front wall, said wall consisting of two panels, one of said panels extending transversely of said body, a driver's seat disposed directly against said panel, the other of said panels comprising a door mounted to swing towards the driver's seat when open, the swinging movement of said door being substantially entirely within the limits of the vehicle whereby the driver occupying said seat may open and close said door without leaving his seat.

2. A vehicle body comprising a front wall, said wall consisting of two panels, one of said panels extending transversely of said body, a driver's seat disposed directly against said panel, the other of said panels being inclined rearwardly from said first named panel and having a door therein mounted to swing towards the driver's seat when opened, the swinging movement of said door being substantially entirely within the limits of the vehicle whereby a driver occupying said seat may open and close said door without leaving his seat.

3. A vehicle body comprising a front wall, said wall consisting of two panels, one of said panels extending transversely of said body, a driver's compartment in front of said wall and having a seat disposed directly against said panel, the other of said panels being inclined rearwardly from said first-named panel and having a door therein mounted to swing towards the driver's seat when opened, the driver's compartment being open on the side adjacent the door whereby a driver occupying said seat may open and close the door without leaving his seat, and persons passing through said door pass through said driver's compartment.

4. In a vehicle having front and rear wheels, a chassis supported by said wheels and comprising a frame depressed between said wheels, a cab carried by said frame adjacent the rear end thereof and having a floor, a driver's compartment in front of said cab and having a floor, running boards carried by said frame and at either side of the vehicle, said running boards and said floors of the cab and driver's compartment being disposed in substantially the same plane.

5. A motor driven passenger vehicle comprising a chassis having its longitudinal side members depressed between the front and rear wheels, a floor on the chassis, running boards at opposite sides of and carried by the chassis and constituting continuations of the floor in substantially the same plane therewith and extending to the outermost lateral dimensions of the vehicle, a body having a width substantially that of the floor, the front wall of the body dividing the floor into a rear passenger space and a front driver's space, a driver's seat in the driver's space and at one side of the vehicle and at the front of the body, and a door in the front wall of the body and at one side of the driver's seat, said door being mounted to remain within the boundaries of the vehicle in its open and closed positions and within reach from the driver's seat.

6. A motor driven passenger vehicle comprising a chassis having its longitudinal side members depressed between the front and rear wheels, a floor on the chassis, running boards at opposite sides of and carried by the chassis and constituting continuations of the floor in substantially the same plane therewith and extending to the outermost lateral dimensions of the vehicle, and a body having a width substantially that of the floor, the front wall of the body dividing the floor into a rear passenger space and a front driver's space, a driver's seat in the driver's space and at one side of the vehicle and at the front wall of the body, the front wall of the body at one side of the driver's seat being inclined rearwardly therefrom and provided with a door within reach from and hinged at that edge which is next to the driver's seat.

PERRY S. BAUER.